(12) United States Patent
Campbell et al.

(10) Patent No.: US 7,712,004 B1
(45) Date of Patent: May 4, 2010

(54) METHOD OF AND SYSTEM FOR ERROR CHECKING IN A DATA STORAGE SYSTEM

(75) Inventors: Brian K. Campbell, Milford, MA (US); Kendell A. Chilton, Southborough, MA (US); Christopher S. MacLellan, Walpole, MA (US); Ofer Porat, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 1371 days.

(21) Appl. No.: 10/675,002

(22) Filed: Sep. 30, 2003

(51) Int. Cl.
*H04L 1/00* (2006.01)

(52) U.S. Cl. .................. 714/746; 714/758; 714/807; 714/819

(58) Field of Classification Search .......... 714/746, 714/6, 758, 807, 799, 712, 715, 819, 821, 714/763, 801
See application file for complete search history.

(56) References Cited

U.S. PATENT DOCUMENTS

| | | | | |
|---|---|---|---|---|
| 5,450,419 | A * | 9/1995 | Hagiawara | 714/746 |
| 5,903,301 | A * | 5/1999 | Hong | 725/123 |
| 5,987,432 | A * | 11/1999 | Zusman et al. | 705/35 |
| 6,205,156 | B1 * | 3/2001 | Watanabe et al. | 370/474 |
| 6,286,125 | B1 * | 9/2001 | Leshay et al. | 714/807 |
| 6,400,728 | B1 * | 6/2002 | Ott | 370/465 |
| 6,601,210 | B1 * | 7/2003 | Kagan | 714/758 |
| 6,662,332 | B1 * | 12/2003 | Kimmitt | 714/762 |
| 6,954,885 | B2 * | 10/2005 | Hurt et al. | 714/701 |
| 7,020,809 | B2 * | 3/2006 | Kleppel et al. | 714/52 |
| 2002/0078292 | A1 | 6/2002 | Chilton | |
| 2002/0087789 | A1 | 7/2002 | Walton et al. | |
| 2002/0194571 | A1 * | 12/2002 | Parr et al. | 714/800 |
| 2003/0093633 | A1 * | 5/2003 | Thiesfeld et al. | 711/154 |
| 2003/0140192 | A1 | 7/2003 | Thibault et al. | |
| 2004/0107398 | A1 * | 6/2004 | Johnson | 714/758 |
| 2004/0153716 | A1 * | 8/2004 | Baker | 714/4 |

* cited by examiner

*Primary Examiner*—Scott T Baderman
*Assistant Examiner*—Fritz Alphonse
(74) *Attorney, Agent, or Firm*—Krishnendu Gupta; Scott A. Ouellette (57) ABSTRACT

An error checking system includes an input device for receiving a data element including parity information; a parity check device for checking the parity information of the data element to determine whether the data element is valid; a CRC generator coupled to the parity check device for generating a CRC for the data element; and an output device for transmitting the data element with the parity information and CRC to a downstream device over a transmission link. The parity check device is operative to output a corruption signal to the CRC generator if the parity check device determines that the data element is invalid, to instruct the CRC generator to corrupt the CRC generation for that data element.

11 Claims, 7 Drawing Sheets

METHOD OF AND SYSTEM FOR ERROR CHECKING IN A DATA STORAGE SYSTEM

This application incorporates by reference, in their entirety, the following co-pending patent applications all assigned to the same assignee as the present invention:

| INVENTORS | FILING DATE | SER. NO. | TITLE |
|---|---|---|---|
| Yuval Ofek et al. | Mar. 31, 2000 | 09/540,828 | Data Storage System Having Separate Data Transfer Section And Message Network |
| Paul C. Wilson et al. | Jun. 29, 2000 | 09/606,730 | Data Storage System Having Point-To-Point Configuration |
| John K. Walton et al. | Jan. 22, 2002 | 10/054,241 | Data Storage System (Divisional of 09/223,519 filed Dec. 30, 1998) |
| John K. Walton | May 17, 2001 | 09/859,659 | Data Storage System Having No-Operation Command |
| Daniel Castel | Mar. 28, 2002 | 10/109,583 | Data Storage System |
| Ofer Porat et al | Mar. 31, 2003 | 10/403,262 | Data Storage System |
| Ofer Porat et al | Mar. 31, 2003 | 10/403,263 | Data Storage System |
| Kendell A. Chilton | Dec. 19, 2000 | 09/741,494 | Methods and Apparatus for Transferring A Data Element Within A Data Storage System |

FIELD OF THE INVENTION

This invention relates generally to data storage systems, and more particularly to data storage systems having error detection and correction capabilities for data transmitted across the backplane of the data storage systems.

BACKGROUND

As is known in the art, large host computers and servers (collectively referred to herein as "host computer/servers") require large capacity data storage systems. These large computer/servers generally include data processors, which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

SUMMARY OF THE INVENTION

A method of and system for error checking in a serial data stream are disclosed. According to one embodiment, an error checking method includes:

A. receiving a data element including parity information;
B. performing a parity check of the data element to determine whether the data element is valid;
C. generating a CRC for the data element; and
D. corrupting the generation of the CRC if the parity check performed determines that the data element is invalid.

The error checking method may further include transmitting the data element with the parity information and CRC to a downstream device over a transmission link. The error checking method may further comprising transmitting an alarm signal to the downstream device if the generation of the CRC has been corrupted in Step D. Step D may include flipping a bit in an associated original CRC generated for a particular data element. Upon receiving the alarm signal, the downstream device may resynchronize the transmission link.

According to another embodiment, an error checking system includes an input device for receiving a data element including parity information; a parity check device for checking the parity information of the data element to determine whether the data element is valid; a CRC generator coupled to the parity check device for generating a CRC for the data element; and an output device for transmitting the data element with the parity information and CRC to a downstream device over a transmission link. The parity check device is operative to output a corruption signal to the CRC generator if the parity check device determines that the data element is invalid, to instruct the CRC generator to corrupt the CRC generation for that data element.

The error checking system may include an alarm device for transmitting an alarm signal to the downstream device when the CRC for a particular data element has been corrupted. The CRC generator may corrupt a CRC by flipping a bit of an associated original CRC generated for a particular data element. The downstream device, upon receiving the alarm signal, may resynchronize the transmission link.

According to another embodiment, a data transmission system includes a master device including a command transmission portion, a response receiving portion, a response timer and a transmission link resynchronization portion; and a slave device, coupled to the master device by a transmission link, having a command receiving portion and a response transmission portion. The response timer of the master device tracks a response time from a time at which a command is transmitted by the master device to the slave device over the transmission link and, if a response is not received from the response transmission portion of the slave device by the response receiving portion of the master device within a predetermined time period, the transmission link resynchronization portion of the master device resynchronizes the transmission link.

The master device may further include an alarm portion for transmitting an alarm to the slave portion prior to the resynchronization of the transmission link by the transmission link resynchronization portion of the master device. The predetermined time period may be a function of a standard maximum time between the transmission of a command by the command transmission portion and the receipt of a response by the response receiving portion. The predetermined time period may be greater than the standard maximum time and may be approximately 150% of the standard maximum time. The master device may be a director board of a data storage system and the slave device may be a memory board of a data storage system.

According to another embodiment, a data transmission method includes:

A. transmitting a command from a master transmission device over a transmission link to a slave transmission device;

B. tracking a response time from the time at which the command is transmitted by the master transmission device to the slave device over the transmission link; and C. resynchronizing the transmission link if a response from the slave transmission device is not received by the master transmission device within a predetermined time period.

The method may further include transmitting an alarm from the master transmission device to the slave transmission device prior to the resynchronization of the transmission link.

According to another embodiment, a data transmission system includes a transmission device for transmitting command data elements to a downstream device, the command data elements being generated and transmitted according to a predetermined protocol; and a reception device for receiving response data elements from the downstream device, the reception device including a protocol checking device for checking at least one state of the response data elements to determine the validity of the at least one state of the response data elements.

The at least one state of the response data elements may include a data structure of the response data elements. If the protocol checking device determines that the at least one state of the response data elements is invalid, it may transmit a status signal to the transmission device to notify the transmission device of the invalidity. The status signal transmitted to the transmission device from the protocol checking device may reset the transmission device.

According to yet another embodiment, a data transmission system includes a data transmission device for transmitting data elements to a downstream device and a data reception device for receiving data elements from the downstream device. The data reception device includes an input CRC checking device coupled to receive the data elements from the downstream device for checking the validity of received data elements based on a CRC associated with each received data element; a memory device coupled to the input CRC checking device for storing data elements received from the downstream device after the data elements have been processed by the input CRC checking device; and an output CRC checking device coupled to receive the data elements from the memory device for checking the validity of the data elements based on the CRC associated with each data element.

If an invalid data element is detected by the input CRC checking device, the input CRC checking device may notify the data transmission device that at least one data element received by the data reception device is invalid. The memory device may include a First In-First Out (FIFO) memory device. The data reception device may include a first data element processing path and a second data element processing path for processing different portions of the received data elements. The input CRC checking device may include a first CRC checking unit coupled to the first data element processing path and a second CRC checking unit coupled to the second data element processing path. The FIFO memory device may include a first FIFO memory unit coupled to the first data element processing path for receiving data elements from the first CRC checking unit and a second FIFO memory unit coupled to the second data element processing path for receiving data elements from the second CRC checking unit.

The first data element processing path may process the high bits of the received data elements and the second data element processing path processes the low bits of the received data elements.

According to another embodiment, a data transmission system includes a transmission device for transmitting a data request to a downstream device, a reception device for receiving data elements requested by the transmission device from the downstream device and a data size checking device coupled between the transmission device and the reception device, which receives a data element size indicator included in the transmitted data request and compares the size of the corresponding data element received by the reception device to the data element size indicator included in the transmitted data request.

The data size checking device may include a counter which is set to the data element size indicator and which is decremented as each portion of the corresponding data element is received by the reception device. After a successful reception of the requested data element, the counter may be set to zero.

According to another embodiment, a data transmission method includes:

A. transmitting a data request to a downstream device;

B. receiving data elements requested by the transmission device from the downstream device; and C. checking a size of the requested data by receiving a data element size indicator included in the transmitted data request and comparing the size of a corresponding received data element to the data element size indicator included in the transmitted data request.

The method may include setting a count to the data element size indicator and decrementing the count as each portion of the corresponding data element is received.

According to yet another embodiment, a data transmission system includes a director board including a plurality of processors, a transmitter which receives instructions from the plurality of processors and transmits commands to a downstream device over a transmission link and a receiver which receives responses to the commands from the downstream device over the transmission link. When no commands are being transmitted by the transmitter to the downstream device, the transmitter transmits a predetermined series of non-data elements to the downstream device. If the receiver receives a response from the downstream device which is not the predetermined series of non-data elements, the receiver notifies at least two of the plurality of processors that an error has occurred on the transmission link.

The predetermined series of non-data elements may include idle and ready non data elements. The predetermined series of non-data elements may be "idle, idle, ready".

DESCRIPTION OF DRAWINGS

These and other features of the invention will become more readily apparent from the following detailed description when read together with the accompanying drawings, in which.

DETAILED DESCRIPTION

Figure 1:
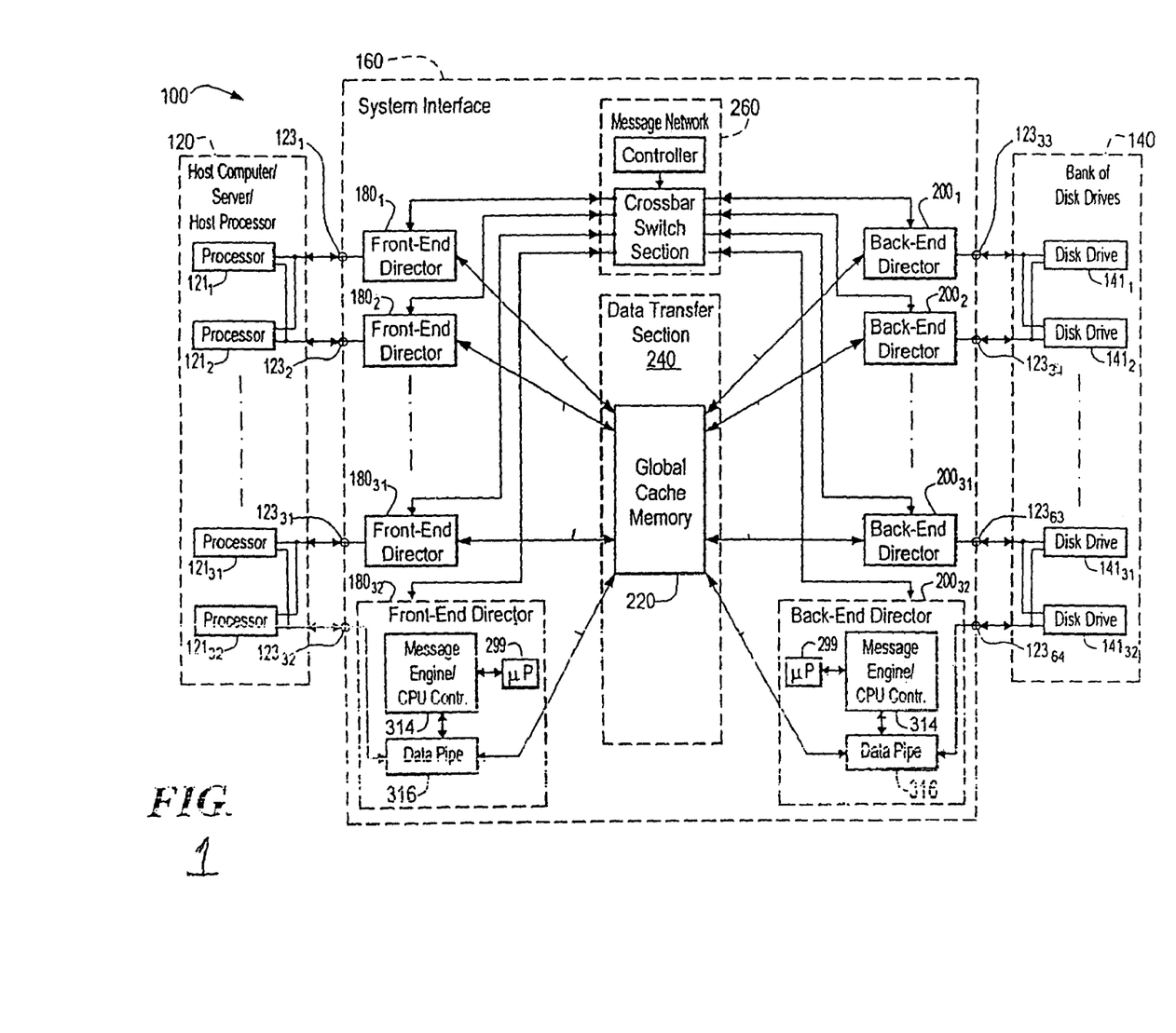
FIG. 1 is a block diagram of a data storage system according to the invention.

Referring now to FIG. 1 a data storage system 100 is shown for transferring data between a host computer/server 120 and a bank of disk drives 140 through a system interface 160. The system interface 160 includes: a plurality of, here 32 front-end directors $180_1$-$180_{32}$ coupled to the host computer/server 120 via ports $123_1$-$123_{32}$; a plurality of back-end directors $200_1$-$200_{32}$ coupled to the bank of disk drives 140 via ports $123_{33}$-$123_{64}$; a data transfer section 240, having a global cache memory 220, coupled to the plurality of front-end directors $180_1$-$180_{16}$ and the back-end directors $200_1$-$200_{16}$; and a messaging network 260, operative independently of the data transfer section 240, coupled to the plurality of front-end directors $180_1$-$180_{32}$ and the plurality of back-end directors $200_1$-$200_{32}$, as shown. The front-end and back-end directors 1801-18032, 2001-20032 are functionally similar and include a microprocessor (μP) 299 (i.e., a central processing unit (CPU) and RAM), a message engine/CPU controller 314 and a data pipe 316.

The front-end and back-end directors $180_1$-$180_{32}$, $200_1$-$200_{32}$ control data transfer between the host computer/server 120 and the bank of disk drives 140 in response to messages passing between the directors $180_1$-$180_{32}$, $200_1$-$200_{32}$ through the messaging network 260. The messages facilitate the data transfer between host computer/server 120 and the bank of disk drives 140 with such data passing through the global cache memory 220 via the data transfer section 240. More particularly, in the case of the front-end directors $180_1$-$180_{32}$, the data passes between the host computer to the global cache memory 220 through the data pipe 316 in the front-end directors $180_1$-$180_{32}$ and the messages pass through the message engine/CPU controller 314 in such front-end directors $180_1$-$180_{32}$. In the case of the back-end directors $200_1$-$200_{32}$ the data passes between the back-end directors $200_1$-$200_{32}$ and the bank of disk drives 140 and the global cache memory 220 through the data pipe 316 in the back-end directors $200_1$-$200_{32}$ and again the messages pass through the message engine/CPU controller 314 in such back-end director $200_1$-$200_{32}$.

With such an arrangement, the cache memory 220 in the data transfer section 240 is not burdened with the task of transferring the director messaging. Rather the messaging network 260 operates independent of the data transfer section 240 thereby increasing the operating bandwidth of the system interface 160.

Figure 2:
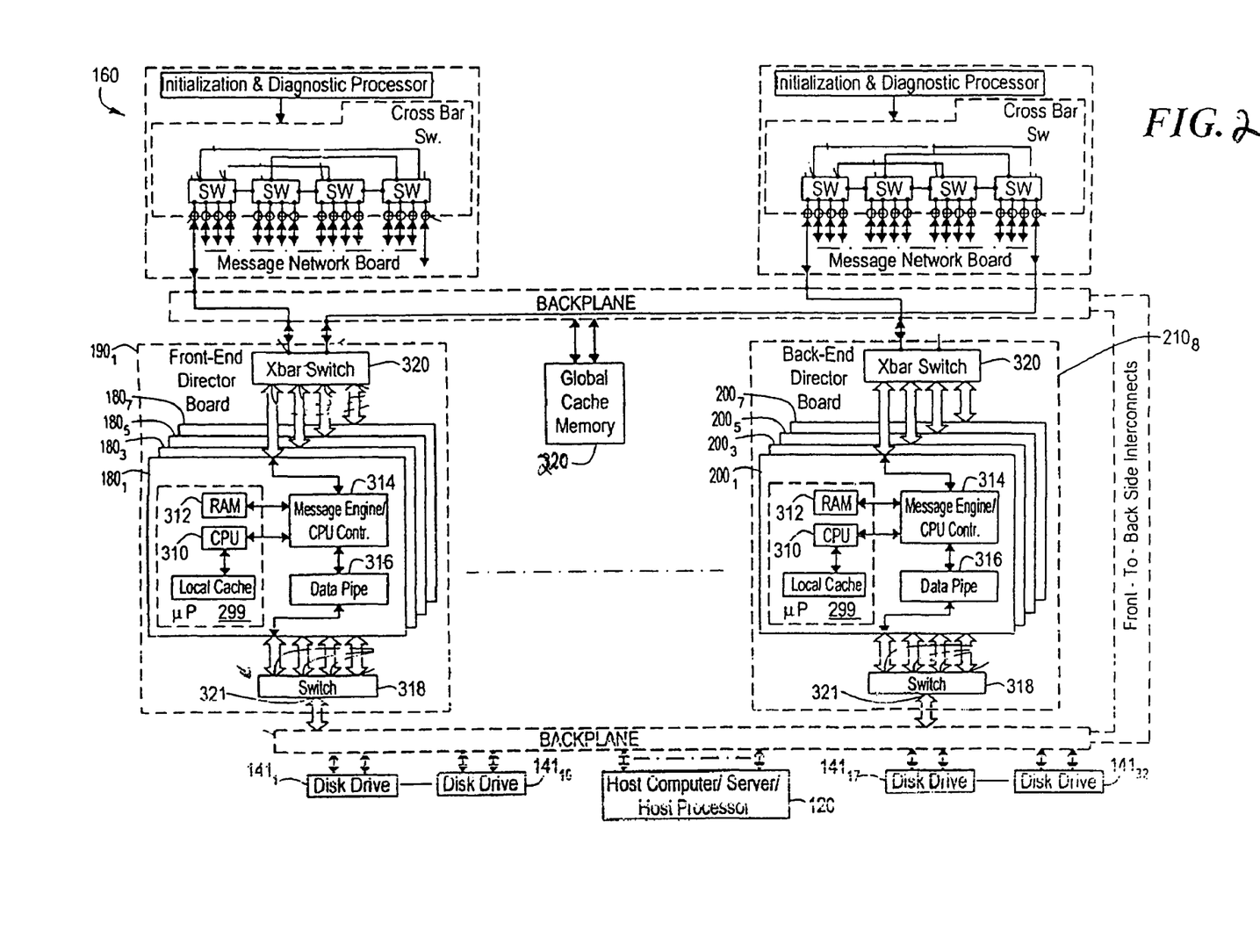
FIG. 2 is a block diagram of the system interface used in the data storage system of FIG. 1.
Figure 3:
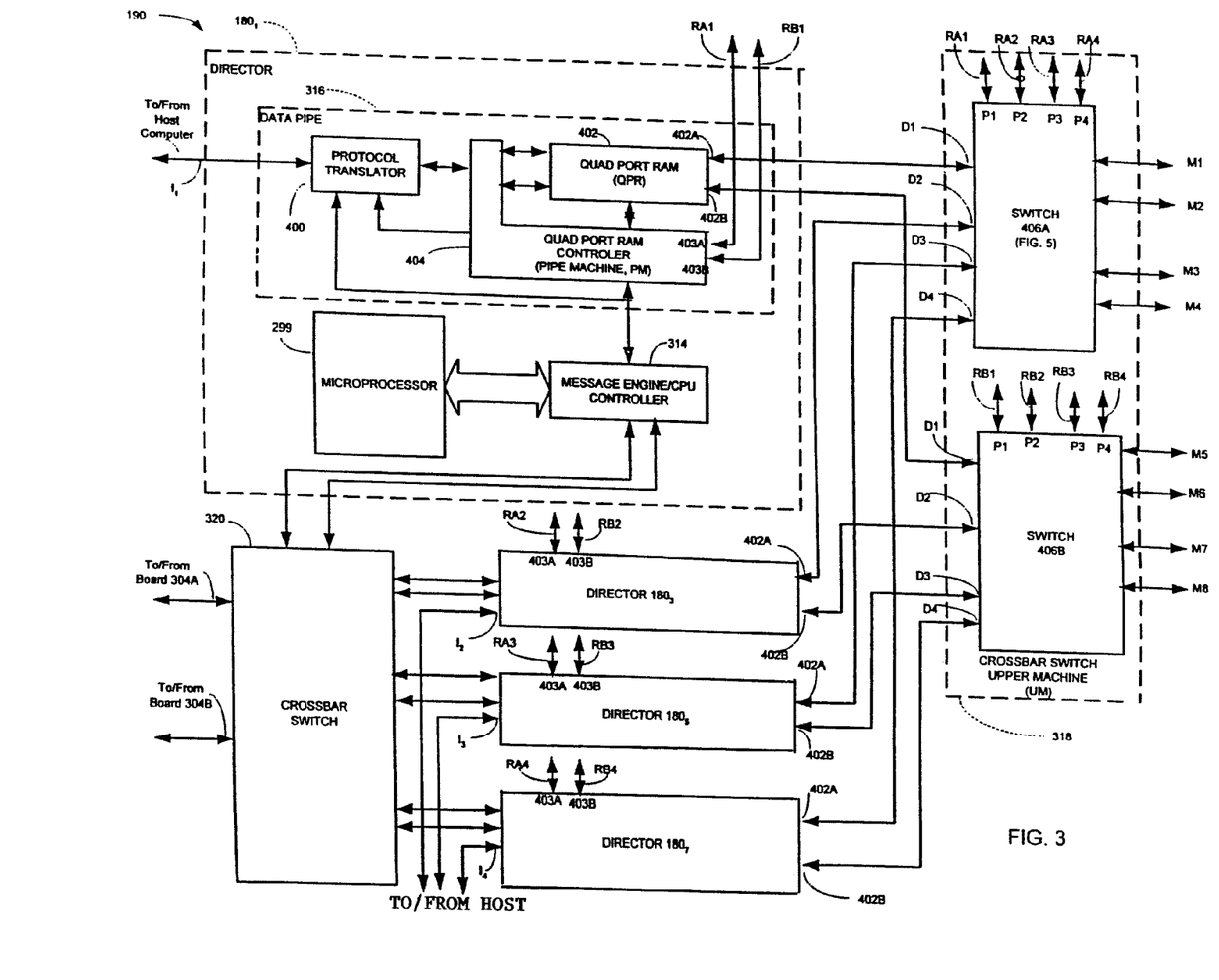
FIG. 3 is a block diagram of an exemplary one of a plurality of director boards used in the interface of FIG. 2.

Referring now to FIGS. 2 and 3, each one of the director boards $190_1$-$210_8$ includes, as noted above, four of the directors $180_1$-$180_{32}$, $200_1$-$200_{32}$ (FIG. 2). It is noted that the director boards $190_1$-$190_8$ having four front-end directors per board, $180_1$-$180_{32}$ are referred to as front-end directors and the director boards $210_1$-$210_8$ having four back-end directors per board, $200_1$-$200_{32}$ are referred to as back-end directors. Each one of the directors $180_1$-$180_{32}$, $200_1$-$200_{32}$ includes the microprocessor 299 referred to above, the message engine/CPU controller 314, and the data pipe 316 shown in FIG. 1.

The front-end director boards have ports $123_1$-$123_{32}$, as shown in FIG. 1 coupled to the processors $121_1$-$121_{32}$, as shown. The back-end director boards have ports $123_{33}$-$123_{64}$, as shown in FIG. 2, coupled to the disk drives $141_1$-$141_{32}$, as shown.

Each one of the director boards $190_1$-$210_8$ includes a crossbar switch 318 as shown in FIG. 3 for an exemplary one of the director boards $190_1$-$210_8$, here director board $190_1$. The crossbar switch 318 has four input/output ports, each one being coupled to the data pipe 316 (FIG. 2) of a corresponding one of the four directors $180_1$-$180_{32}$, $200_1$-$200_{32}$ on the director board $190_1$-$210_8$. The crossbar switch 318 has eight output/input ports collectively identified in FIG. 3 by numerical designation 321 (which plug into the backplane 302). The crossbar switch 318 on the front-end director boards $191_1$-$191_8$ is used for coupling the data pipe 316 of a selected one of the four front-end directors $180_1$-$180_{32}$ on the front-end director board $190_1$-$190_8$ to the global cache memory 220 via the backplane 302 and I/O adapter, not shown. The crossbar switch 318 on the back-end director boards $210_1$-$210_8$ is used for coupling the data pipe 316 of a selected one of the four back-end directors $200_1$-$200_{32}$ on the back-end director board $210_1$-$210_8$ to the global cache memory 220 via the backplane 302 and I/O adapter, not shown.

Thus, referring to FIGS. 1 and 2, the data pipe 316 in the front-end directors $180_1$-$180_{32}$ couples data between the host computer 120 and the global cache memory 220 while the data pipe 316 in the back-end directors $200_1$-$200_{32}$ couples data between the bank of disk drives 140 and the global cache memory 220. It is noted that there are separate point-to-point data paths PTH1-PTH64 (FIG. 1) between each one of the directors $180_1$-$180_{32}$, $200_1$-$200_{32}$ and the global cache memory 220.

Further, as described in the co-pending patent applications referred to above, crossbar switch 320 (FIG. 2) plugs into the backplane 302 and is used for coupling to the directors to the message network 260 (FIG. 2) through the backplane.

Referring now to FIG. 3, an exemplary one of the director boards $190_1$-$190_8$, $210_1$-$210_8$, here director board $190_1$ is shown to include directors $180_1$, $180_3$, $180_5$ and $180_7$. An exemplary one of the directors $180_1$-$180_4$, here director $180_1$ is shown in detail to include the data pipe 316, the message engine/CPU controller 314, and the microprocessor 299, arranged as shown.

The data pipe 316 includes a protocol translator 400, a data pipe memory, here a quad port RAM (QPR) 402 and a data pipe memory controller, here a quad port RAM controller (herein also referred to as a pipe machine, PM) 404 arranged as shown. Briefly, the protocol translator 400 converts between the protocol of the host computer 120, in the case of a front-end director $180_1$-$180_{32}$, (and between the protocol used by the disk drives in bank 140 in the case of a back-end director $200_1$-$200_{32}$) and the protocol between the directors $180_1$-$180_3$, $200_1$-$200_{32}$ and the global memory 220 (FIG. 1). More particularly, the protocol used the host computer 120 may, for example, be fibre channel, SCSI, ESCON or FICON, for example, as determined by the manufacture of the host computer 120 while the protocol used internal to the system interface 160 (FIG. 2) may be selected by the manufacturer of the interface 160. The quad port RAM 402 is a FIFO controlled by controller 404 because the rate data coming into the RAM 402 may be different from the rate data leaving the RAM 402. The RAM 402 has four ports. Here, the protocol translator 400 produces digital words for the system, interface 160 (FIG. 1) protocol, one portion of the word is coupled to one of a pair of the ports of the quad port RAM 402 and the other portion of the word is coupled to the other one of the pair of the ports of the quad port RAM 402.

The quad port RAM 402 has a pair of ports 402A, 402B, each one of two ports 402A, 402B. Data is transferred between the ports 402A, 402B and the cache memory 220 (FIG. 1) through the crossbar switch (herein also referred to as the upper machine, UM) 318, as shown.

The crossbar switch 318 includes the pair of switches 406A, 406B. Each one of the switches 406A, 406B includes four QPR ports D1-D4; four pipe machine (PM) ports P1-P4 and four input/output memory-side ports M1-M4, M5-M8, respectively, as indicated. The input/output memory-side ports M1-M4, M5-M8 are collectively shown in connection with FIG. 2 as port 321).

Referring to FIG. 3, the ports D1-D4 of switch 406A are connected to the 402A ports of a corresponding one of the quad port RAMs 402 in each one the directors $180_1$, $180_3$, $180_5$ and $180_7$, respectively, as indicated. Likewise, QPR ports D1D4 of switch 406B are connected to the 402B ports of the quad port RAMs 402 of a corresponding one of the directors $180_1$, $180_3$, $180_5$, and $180_7$, respectively, as indicated. The PM ports P1-P4 of switch 406A are connected to the one of the pair of ports 403A, 402A ports, here ports 403A of a corresponding one of the quad port RAM controllers 404 in each one the directors $180_1$, $180_3$, $180_5$, and $180_7$, respectively, as indicated though busses RA1-RA4, respectively, as shown. Likewise, the PM ports P1P4 of switch 406B are connected to the 403B ports of the quad port RAM controller 404 of a corresponding one of the directors $180_1$, $180_3$, $180_5$, and $180_7$, respectively, as indicated, through busses RB1-RB4, respectively, as shown.

The ports D1-D4 are selectively coupled to the ports M1-M4 in accordance with control words provided to the switch 406A by the controllers 404 in directors $180_1$, $180_3$, $180_5$, and $180_7$ on busses RA1-RA4, respectively, and the ports D1-D4 are coupled to ports M5-M8 in accordance with the control words provided to switch 406B by the controllers 404 in directors $180_1$, $180_3$, $180_5$, and $180_7$ on busses RB1-RB4, as indicated.

The signals RA1-RA4, are coupled to PM ports P1-P4, respectively, of switch 406A and the buses RB1-RB4, are coupled to PM ports P1-P4, respectively, of switch 406B. The signals on buses RA1-RA4 include request signals and also enable data transfer between the memory ports M1-M8 through the pipe machine 404 and the microprocessor 299. Thus, for example, the signal on bus RA1 from the PM 404 of director $180_1$ may be used to request data transfer between one of the memories $M_1$-$M_4$ through the QPR 402 and the host computer through switch 406A. The bus RA1 may also be used to transfer data between one of the memories $M_1$-$M_4$ and the microprocessor 299 in director $180_1$.

Likewise, the signal on bus RB1 from the PM 404 of director $180_1$ may be used to request data transfer between one of the memories $M_5$-$M_8$ through the QPR 402 and the host computer through switch 406B. The bus RB1 may also be used to transfer data between one of the memories $M_5$-$M_8$ and the microprocessor 299 in director $180_1$.

The other directors $180_1$, $180_3$, $180_5$ and $180_7$ operate in a similar manner with respect to busses RA2, RB2; RA3, RB3; and RA4, RB4, respectively.

Figure 4:
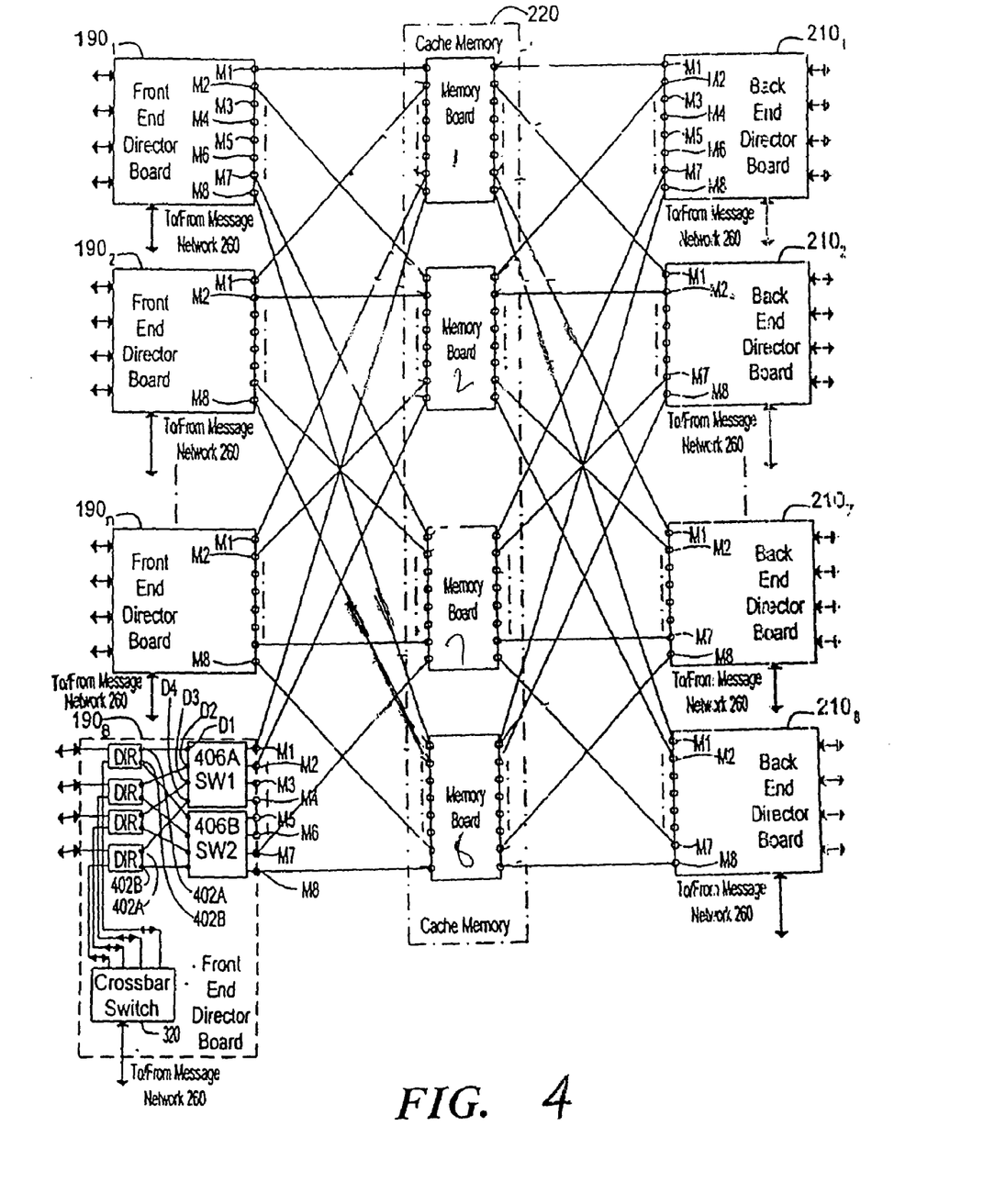
FIG. 4 is a diagram of the interface of FIG. 3 having a plurality of the director boards of FIG. 3 interconnected to a global cache memory.

Considering the request signals on the busses $R_{A1}$-$R_{A4}$ for exemplary switch 406A, of any one of the directors $180_1$, $180_3$, $180_5$, $180_7$ may be coupled to any one of the ports $M_1$-$M_4$ of switch 406A, selectively in accordance with the request signals on buses $R_{A1}$-$R_{A4}$. Likewise, port 402B of any one of the directors $180_1$-$180_4$ may be coupled to any one of the ports $M_5$-$M_8$ of switch 406B, selectively in accordance with the request signals on buses $R_{B1}$-$R_{B4}$. The coupling between the director boards $190_1$-$190_8$, $210_1$-$210_8$ and the global cache memory 220 is shown in FIG. 4.

Referring again to FIG. 3, as noted above, the crossbar switch 318 includes a pair of crossbar switches 406A, 406B. Each one of the switches 406A, 406B includes four input/output director-side, or QPR ports $D_1$-$D_4$ and the four input/output memory-side ports collectively designated in FIG. 2 by numerical designation 321. The QPR ports $D_1$-$D_4$ of switch 406A are connected to the four directors on the director board, as indicated. Likewise, QPR ports $D_1$-$D_4$ of switch 406B are also connected to the dual-ported directors on such board, as indicated. Thus, as described in the co-pending patent applications referred to above, each director is a dual-ported director.

More particularly, and referring also to FIG. 1, as noted above, each one of the host computer processors $121_1$-$121_{32}$ in the host computer 120 is coupled to a pair of the front-end directors $180_1$-$180_{32}$, to provide redundancy in the event of a failure in one of the front end-directors $181_1$-$181_{32}$ coupled thereto as described in the above-referenced patent applications.

Referring again to FIG. 3, the switching network 318 is coupled to the cache memory 220 (FIG. 1) to transfer data between the memory 220 and: (a) the input I of a selected one of the plurality of directors $180_1$, $180_3$, $180_5$, $180_7$ through the quad port RAM 402, (i.e., an I/O transfer); (b) the microprocessor 299 and the data pipe memory through the quad port RAM controller 404 of a selected one of the plurality of directors $180_1$, $180_3$, $180_5$, $180_7$, (i.e., a DMA transfer adapted to transfer words into or from the cache memory 220); and (c) the microprocessor 299 and the quad port RAM controller 404 while by-passing the quad port RAM 402 of a selected one of the plurality of directors $180_1$, $180_3$, $180_5$, $180_7$ (i.e., a DSA transfer adapted to transfer words to or from the cache memory 220).

Figure 5:
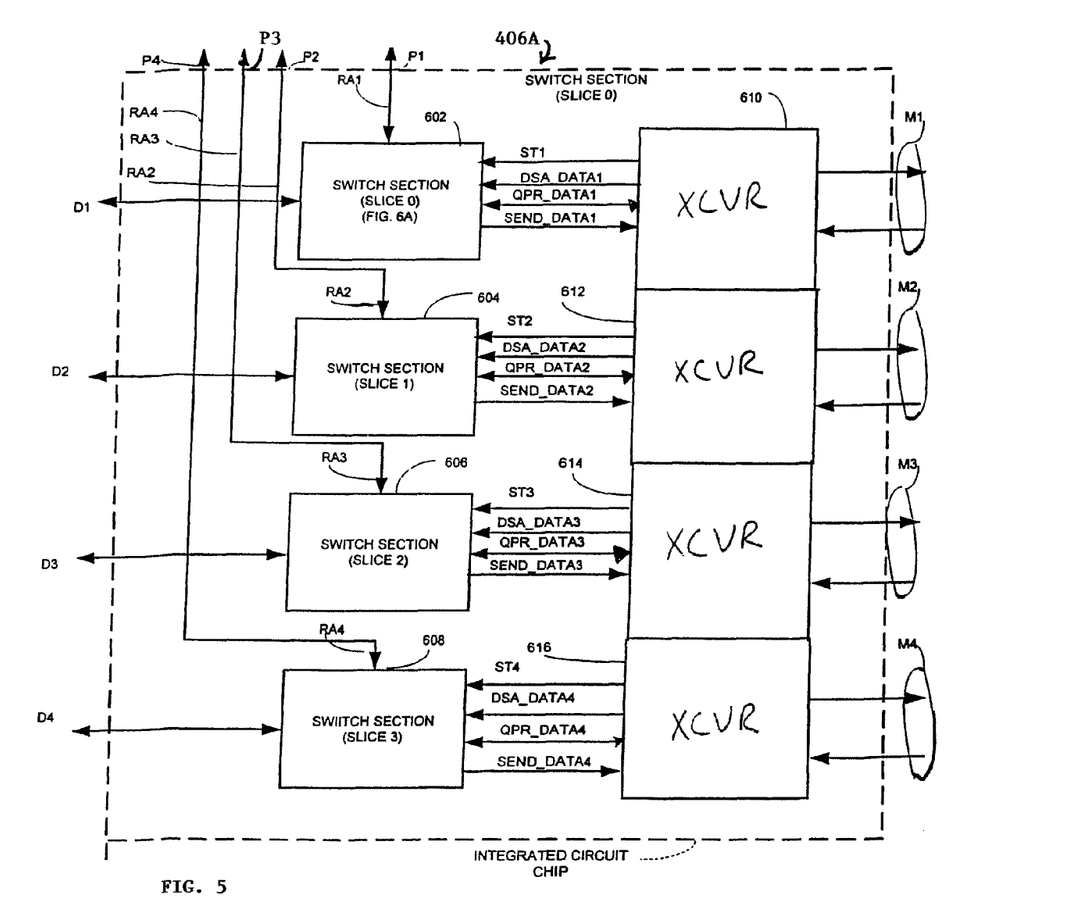
FIG. 5 is a block diagram of an exemplary one of a pair of switches used in a switching network on the director board of FIG. 3.

Referring now to FIG. 5, the details of an exemplary one of the pair of switches, here switch 406A is shown. The switch 406A has, in addition to ports D1-D4 which are coupled to quad port RAMs (QPRs) 402 of a corresponding one of the four directors $180_2$-$108_4$, respectively, has four ports P1-P4 coupled to QPR controller 404 (FIG. 3) (also referred to as pipe machines, PM) of a corresponding one of the four directors $180_2$-$108_4$, respectively, as shown in FIG. 3. The switch 406A is shown in more detail in FIG. 5 to include four identical switch sections 602, 604, 606, and 608, and four identical transceivers 610, 612, 614 and 616, as shown. Each one of the switch sections 602, 604, 606, and 608 is coupled to a corresponding one of the transceivers (XCVRs) 610-616, respectively, as indicated. As described in greater detail below, each one of the transceivers 610-616 are coupled to ports M1-M4, respectively, such ports M1-M4 being coupled to the cache memory 220, as shown in FIG. 4, of the memory boards, as indicated. It is noted that the switch sections 602-604 and the transceivers 610-616 are formed on a semiconductor chip.

Figure 6:
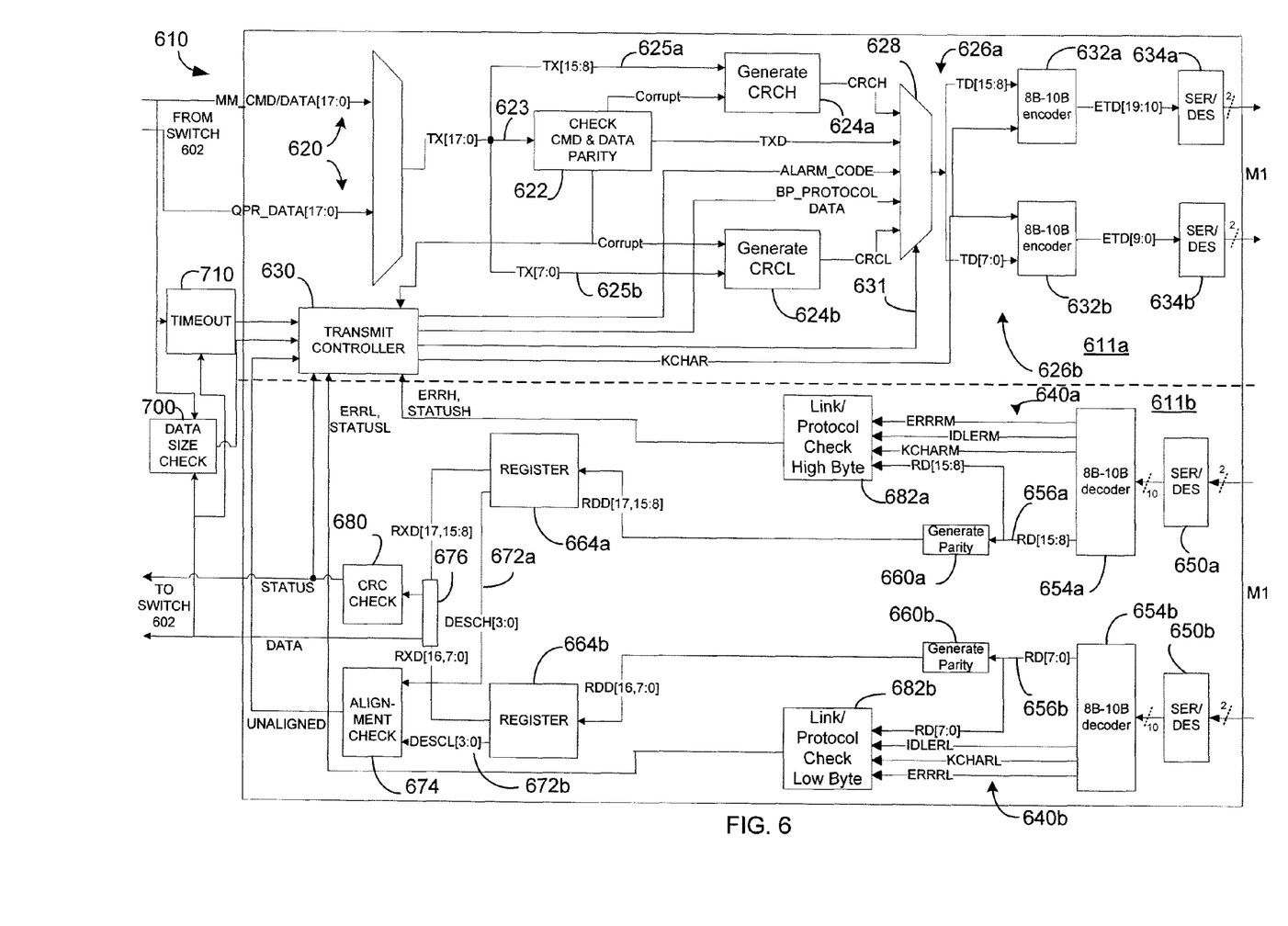
FIG. 6 is a block diagram of an exemplary one of the four transceivers used in the switch section of FIG. 5.

Referring now to FIG. 6, the details of an exemplary one of the XCVRs 610-616, in this case XCVR 610, is shown. As shown in FIG. 6, XCVR 610 includes a transmitter portion 611a and a receiver portion 611b. Transmitter portion 611a receives read/write commands and data from its respective switch 602 via inputs 620. The received commands and data are in the form of an 18 bit data element, including 16 bits of data and 2 parity bits. All 18 bits of the data element are transmitted to parity checking device 622 on line 623, and the 16 bits of data are transmitted to CRC generators 624a and 624b on lines 625a and 625b, respectively. In a preferred embodiment, CRC generators 624a and 624b apply a checksum of the data that follows the formula: $x^{16}+x^{15}+x^5+1$. However, it will be understood that any appropriate CRC equation may be utilized.

As shown in FIG. 6, transmitter portion 611*a* includes a high bit stream 626*a*, for transmitting the highest 8 bits (bits 8 through 15) of the 16 bits of data and a low bit stream 626*b* for transmitting the lowest 8 bits (bits 0 through 7) of the 16 bits of data. While the invention is described using data elements of particular lengths, it will be understood that the length of the data elements transmitted/received by the invention is not bound by this description. Furthermore, while the invention is described as including high bit streams and low bit streams, it will be understood that a single bit stream or more than two bit streams may be utilized.

The parity of the data element is checked by the parity checking device 622 to insure that the command and data have not been corrupted during the transmission to the parity checking device 622. A high-bit CRC (CRCH) is generated in the CRC generator 624*a* based on the highest 8 bits and a low-bit CRC (CRCL) is generated in the CRC generator 624*b* based on the lowest 8 bits. The CRCH, CRCL and the data to be transmitted TX, are input to a multiplexer 628, as well as protocol information and an alarm code, which are generated in a controller 630, which is described below. The multiplexer is controlled by an output 631 from the transmit state machine, which determines which of the inputs of the multiplexer 628 will be output therefrom.

In normal operating conditions, the high 8 bits of the data element will be output from the multiplexer 628 to an 8 bit to 10 bit (8B-10B) encoder 632*a* and the low 8 bits of the data element will be output from the multiplexer 628 to an 8 bit to 10 bit (8B-10B) encoder 632*b*. In each encoder 632*a*, 632*b*, the input 8 bits are converted to a 10 bit word, in a manner known in the art. The resulting high 10 bits are output to a SERDES device 634*a* where they are converted from a parallel form to a serial form and output to the backplane (not shown) via port M1. Likewise, the resulting low 10 bits are output to a SERDES device 634*b* where they are converted from a parallel form to a serial form and output to the backplane and downstream devices (not shown) over a transmission link via port M1.

In the event that the parity checking device 622 determines that the parity associated with the data element to be transmitted by the transmitting portion 611*a* is invalid, indicating that the data element has been corrupted before reaching the transmitter, the parity checking device 622 outputs a CORRUPT signal to both CRC generators 624*a* and 624*b*, as well as to the transmit state machine 630. The CORRUPT signal instructs the CRC generators 624*a* and 624*b* to corrupt the CRC that is being generated for that data element. In a preferred embodiment, the CRC is corrupted by "flipping" one of the bits of the CRC, however, any manner of corrupting the CRC may be utilized. This will cause a CRC checking device downstream to more readily determine that an error has occurred in connection with the data element, as the parity information associated with the word is not transmitted with the data element in its serial form. The CORRUPT signal also informs the controller 630 of the error, which causes the controller 630 to output an alarm code (ALARM_CODE) to the multiplexer 628, which is output to the backplane via encoders 632*a*, 632*b* and SERDES 634*a*, 634*b* when instructed by control signal 631.

The alarm code is typically a "K" character, such as K28.4, followed by a data element identifying the reason for the alarm. All errors on the director that cause an alarm are also latched in internal registers (not shown) on the director. The processors associated with the director have access to these internal registers and the codes may be used for the purpose of debugging the system. On the memory board that receives an alarm, such as the bad parity alarm discussed above, the alarm code indicates to the memory what the error was and on which command it occurred.

As discussed above, if the parity checking device 622 determines that the parity of a particular data element is incorrect, the CRC generated for the data element is corrupted and an alarm code is transmitted to the downstream device, which in the preferred embodiment is a memory board. The alarm code indicates to the memory board that the director detected incorrect parity on the current data transfer. The alarm code, in addition to the corruption of the CRC, is advantageous, since, if the parity error is detected on the last piece of data transmitted by the transmitting portion 611*a*, then the corrupted CRC may be transmitted before the alarm from the controller 630. Transmitting the alarm enables the downstream device to react to the error more quickly than if it waited for the CRC checker on the downstream device to detect the CRC error. When the downstream device detects the alarm code, it can resynchronize the transmission link coupled between the devices, which enables the next transfer to take place.

As described above and in the related applications, in the case of a write operation, the write command and data to be written are transmitted from the director to the memory board over a transmission link and backplane (not shown) via port M1. Once the data is written to the specified location on the memory, the memory board returns a status signal to the director over the transmission link and backplane and through port M1. Likewise, in the case of a read operation, the read command, which includes the location in the memory and the size of the data to be read, is transmitted from the director to the memory board over the transmission link via port M1. The memory board returns the requested data along with a status signal to the director over the transmission link and through port M1.

Communications from the memory board are received by the receiver portion 611*b* of the XCVR 610. As shown in FIG. 6, receiver portion 611*b* includes a high bit stream 640*a*, for transmitting the highest bits of the data and a low bit stream 640*b* for transmitting the lowest bits of the data. Accordingly, the highest bits of the data transmitted by the memory board are received by SERDES 650*a* and the lowest bits of the data transmitted by the memory board are received by SERDES 650*b*. SERDES 650*a* and 650*b* covert the serial data into a 10-bit parallel form and 8B-10B decoders 654*a* and 654*b* convert the 10-bit data to 8-bit data. As shown in FIG. 6, bits 8-15 of the received data element are output from 8B-10B decoder 654*a* on line 656*a* and bits 0-7 of the received data element are output from 8B-10B decoder 654*b* on line 656*b*. Since the data is transmitted serially to the receiver portion 611*b*, as soon as it is decoded in decoders 654*a*, 654*b*, parity is generated for each portion of the data element. The high bits of the read data (RD[15:8]) are input to parity generator 660*a* and the low bits of the read data (RD[7:0]) are input to parity generator 660*b*, where a parity bit is added to each data element.

Once the parity bit is added to each of the high and low bits of the data element, the high bits are input to a register 664*a* and the low bits are input to a register 664*b*. Registers 664*a* and 664*b* are preferably FIFO memory devices and operate to align the high and low bits of each data element received before they are recombined and transmitted to the director on line 670. However, it will be understood that any type of suitable memory device may be used in the implementation of registers 664*a* and 664*b*. Registers 664*a* and 664*b* also output an alignment status signal on lines 672a and 672b, respectively, to alignment checking device 674. If the alignment status signals on lines 672a and 672b indicate that the high bits and low bits of the data element are not properly aligned, the alignment checking device 674 sends a signal to the transmitter controller 630. The transmit controller then transmits an alarm code as described above, which notifies the downstream devices of the alignment error and can then resynchronize the transmission link and continue with the data transfer.

From each register 664a, 664b, the high and low bits of the data element are recombined into the data element at combining device 676. As described above, the data element is then transmitted to the director that requested it via switch 602. The data element is also input to CRC checking device 680 where the validity of the data element is checked according to the CRC to determine whether the data element has been corrupted during the transmission from the downstream device or within the registers 664a, 664b. The output of the CRC checking device 680 is transmitted to the associated switch device as a status signal and to the transmit controller 630 to inform the controller of any error. If a CRC error is detected, the transmit controller 630 transmits an alarm code as described above, which notifies the downstream devices of the CRC error and can then resynchronize the transmission link and continue with the data transfer.

Returning to the 8B-10B decoders 640a, 640b, the high bits of the data element on line 656a are transmitted to a link/protocol checking device 682a where the data element is checked to insure that the protocol for the transmission is being followed correctly. The preferred protocol, as described in the incorporated applications, requires that the data elements transmitted and received by the transceivers follow particular conditions by conforming to various states required by the protocol. The protocol checking device preferably includes a state machine that checks each data element to insure that it is conforming to the states dictated by the protocol. For example, in the case of the receiver portion 611b receiving the result of a read command transmitted by the transmitting portion 611a to a downstream memory board, a correct data element received by the receiver portion 611b will have the SOF field followed by the data read from the memory and its error correction code. The data element will then have an MOF field followed by read status information and ending with an EOF field. If a received data element does not conform to this format, an error has occurred and the link/protocol checking device 682a outputs an error signal to the transmit controller 630. The transmit controller 630 then transmits an alarm code as described above, which notifies the downstream devices of the protocol error and can then resynchronize the transmission link and continue with the next data transfer. Likewise, the low bits of the data element on line 656b are transmitted to a link/protocol checking device 682b where the data element is checked to insure that the protocol for the transmission is being followed correctly. If it is not, the link/protocol checking device 682b outputs an error signal to the transmit controller 630.

The link checking portion of each link/protocol checking device 682a, 682b operates to insure that the transmission on the backplane between the downstream device and the receiving portion 611b is operating properly. The link portion checks incoming data elements for errors that can occur during transmission that are not the result of protocol errors. For example, in a preferred embodiment, the link checking portion monitors the amplitude of the incoming data elements to insure that if a loss of signal, wherein the amplitude of the serial lines has decreased below a predetermined level, occurs, an error signal is sent to the transmit controller 630. The link checking portion also monitors the output of the 8B-10B decoders to determine whether the decoders have detected an invalid code on the incoming data elements. Furthermore, the link checking portion can monitor the 8B-10B decoders for disparity errors. In the case of loss-of-signal errors or errors associated with the 8B-10B decoders, the link/protocol checking devices 682a, 682b notify the transmit controller 630, which can then take the appropriate action, as described above, such as send an alarm code and resynchronizing the transmission link.

Each XCVR 610 also includes a data size checking device 700 which monitors the sizes of the data requested by and transferred to the XCVR 610. More specifically, it monitors the transfer size of requested data that is specified in each read command transmitted from the XCVR 610 and compares the specified size to the size of the data received by the receiver portion 611b. Preferably, the transfer size specified in the command is stored in a counter (not shown) in the data size checking device 700 that is decremented as each data word is received by the receiving portion 611b. Therefore, a successful reception of the requested data would result in the counter being set to zero once the requested data is fully received. If the size of the data received by the receiving portion 611b does not match the size specified in the read command, such that the counter is set to zero after the reception of the data, the data size checking device 700 outputs an error signal to the transmit controller 630 to inform the controller of the error. The transmit controller 630 then transmits an alarm code as described above, which notifies the downstream devices of the error and can then resynchronize the transmission link and continue with the data transfer.

Each XCVR 610 also includes a timeout device 710 which monitors the amount of time taken by the downstream memory device to return a response to a request transmitted by the transmitting portion 611a. Since the amount of time typically expected for a read or write operation is known to the director, the timeout device 710, once a read or write command is transmitted from the transmitting portion 611a to the memory device, begins a clock to monitor the response time. If a response is not received by the receiver portion 611b within a predetermined response time, the timeout device 710 outputs an error signal to the transmit controller 630 to inform the controller of the error. The transmit controller 630 then transmits an alarm code as described above, which notifies the downstream devices of the error and can then resynchronize the transmission link and continue with the data transfer. In one preferred embodiment, the predetermined response time is approximately 150% of the expected response time, although any predetermined response time greater than the expected response time may be utilized.

In the operation of the XCVR 610 described above, whenever an error is detected and an error signal is sent to the transmit controller 630, the processor that currently has control of the XCVR for the purpose of writing data to or reading data from a memory device is notified of the error condition. However, if link or protocol errors occur on the backplane when no commands are being processed, it is important that these errors be identified and reported so the cause of the errors can be addressed and remedied.

As set forth in the incorporated applications, even when no commands are being processed by the XCVR, the protocol instructs the director, through the XCVR, to repeatedly transmit an "idle semaphore", which includes a sequence of "Idle" and "Ready" signals, across the backplane transmission link. In a preferred embodiment, the sequence is "Idle, Idle, Ready"; "Idle, Idle, Ready"; etc. The receiving portion 611b receives the idle semaphore and determines that, if the idle semaphore is not received in the correct sequence, that an error must have taken place on the backplane. This error is detected in the link/protocol checking devices 682*a*, 682*b*. In such a case, since none of the processors on the director board have control of the backplane through the XCVR, the link/protocol checking devices 682*a*, 682*b* transmit an error signal to the transmit controller 630, which causes an asynchronous event interrupt to be transmitted from the XCVR to all of the processors on the director board. These interrupts can be accumulated for later use in determining which links in the system are not performing properly.

Figure 7:
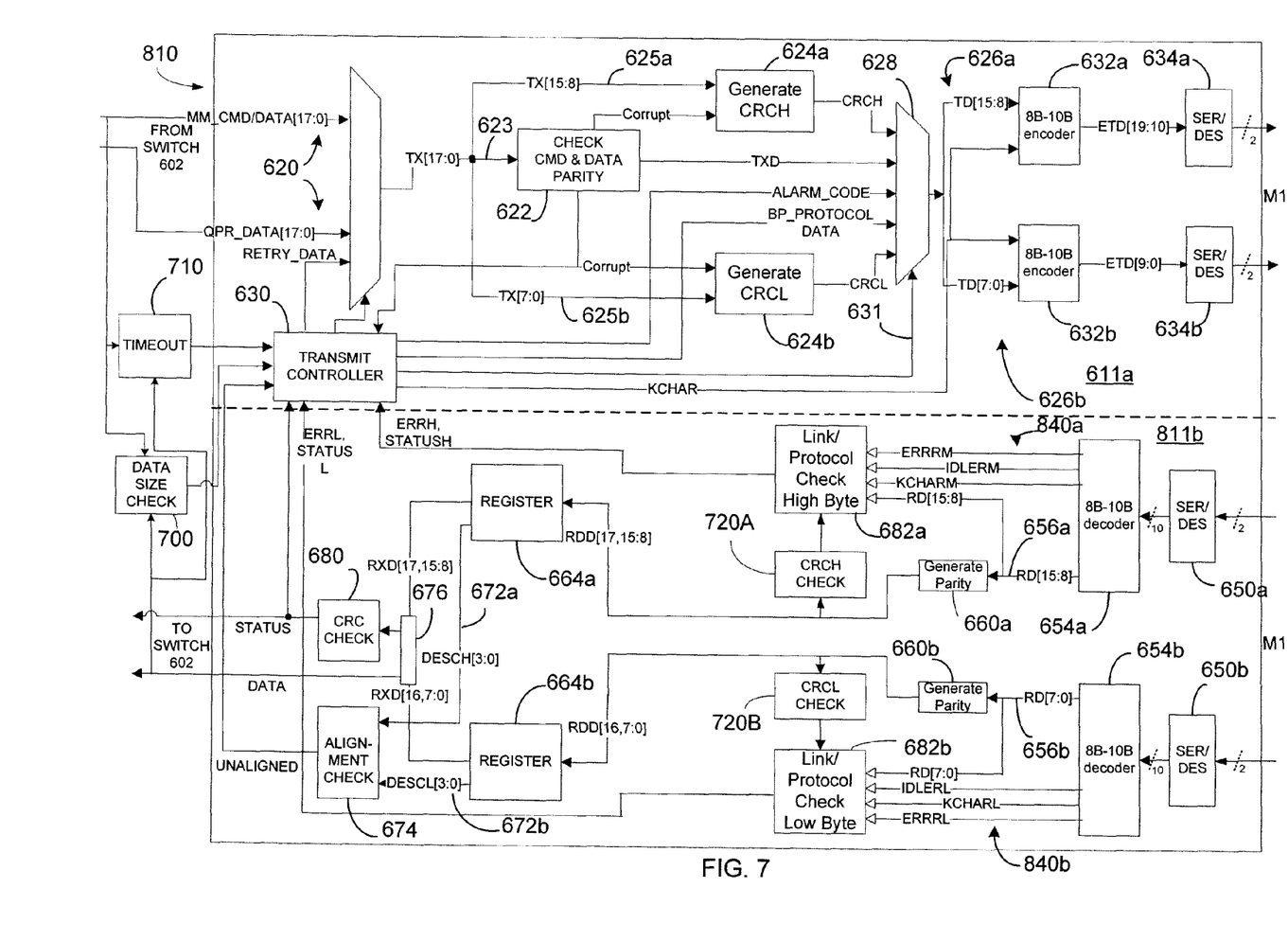
FIG. 7 is a block diagram of another exemplary one of the four transceivers used in the switch section of FIG. 5.

FIG. 7 is a block diagram of another embodiment of the XCVR 810 in which the receiver portion 811*b* includes additional CRC checking devices 720*a* and 720*b* on the high and low bit streams 840*a* and 840*b*, respectively. All other components shown in FIG. 7 are identical to the like-numbered components shown in FIG. 6. In this embodiment, after parity is generated on the received data in parity generators 660*a*, 660*b*, the CRC of the data elements is checked in CRC checking devices 720*a*, 720*b*, respectively. The data is then input to registers 664*a*, 664*b* and processed as described above. If either of the CRC checking devices 720*a*, 720*b* detects an error in the CRC associated with the received data element, it sends and error signal to its associated link/protocol checking device 682*a*, 682*b*. The link/protocol checking device 682*a*, 682*b* then notifies the transmit controller 630 of the error. Checking the CRC of the received data elements prior to storing the data elements in the registers 664*a*, 664*b*, enables the XCVR 810 to retry the transmission of the corrupted data element before the corrupted data element is transmitted from the receiver 811*b* to the upstream switch. A process for retrying a transmission is described in the incorporated applications.

Other embodiments are within the spirit and scope of the appended claims. For example, while the XCVR has been described as part of the switch 318 of FIG. 2, it could also be utilized as the crossbar switch 320 shown in FIG. 2 which controls communications between the director board and the global cache memory 220. Furthermore, the XCVRs may be utilized on the back-end directors 200₁-200₃₂, as well as the front-end directors as described.

What is claimed is:

1. An error checking system comprising:
   an input device for receiving a data element including parity information;
   a parity check device for checking the parity information of the data element to determine whether the data element is valid;
   a CRC generator coupled to the parity check device for generating a CRC for the data element; and
   an output device for transmitting the data element with the parity information and CRC to a downstream device over a transmission link;
   wherein the parity check device is operative to output a corruption signal to the CRC generator if the parity check device determines that the data element is invalid, to instruct the CRC generator to corrupt the CRC generation for that data element.

2. The error checking system of claim 1 further comprising an alarm device for transmitting an alarm signal to the downstream device when the CRC for a particular data element has been corrupted.

3. The error checking system of claim 2 wherein the downstream device, upon receiving the alarm signal, resynchronizes the transmission link.

4. The error checking system of claim 1 wherein the CRC generator corrupts a CRC by flipping a bit of an associated original CRC generated for a particular data element.

5. A data transmission system comprising:
   a data transmission device for transmitting data elements to a downstream device;
   a data reception device for receiving data elements from the downstream device, the data reception device including:
      an input CRC checking device coupled to receive the data elements from the downstream device for checking the validity of received data elements based on a CRC associated with each received data element;
      a memory device coupled to the input CRC checking device for storing data elements received from the downstream device after the data elements have been processed by the input CRC checking device; and
      an output CRC checking device coupled to receive the data elements from the memory device for checking the validity of the data elements based on the CRC associated with each data element.

6. The system of claim 5 wherein, if an invalid data element is detected by the input CRC checking device, the input CRC checking device notifies the data transmission device that at least one data element received by the data reception device is invalid.

7. The system of claim 6 wherein the memory device includes a First In-First Out (FIFO) memory device.

8. The system of claim 7 wherein the data reception device includes a first data element processing path and a second data element processing path for processing different portions of the received data elements.

9. The system of claim 8 wherein the input CRC checking device includes a first CRC checking unit coupled to the first data element processing path and a second CRC checking unit coupled to the second data element processing path.

10. The system of claim 9 wherein the FIFO memory device includes a first FIFO memory unit coupled to the first data element processing path for receiving data elements from the first CRC checking unit and a second FIFO memory unit coupled to the second data element processing path for receiving data elements from the second CRC checking unit.

11. The system of claim 10 wherein the first data element processing path processes the high bits of the received data elements and the second data element processing path processes the low bits of the received data elements.

* * * * *